United States Patent [19]

Kobayashi et al.

[11] 4,173,290

[45] Nov. 6, 1979

[54] BONDED CAN HAVING HIGH HOT WATER RESISTANCE AND UNDERCOATING COMPOSITION FOR USE IN PRODUCTION THEREOF

[75] Inventors: Seishichi Kobayashi, Yokohama; Tatsuo Mori, Kawasaki; Hiroshi Ueno, Yokosuka, all of Japan

[73] Assignee: Toyo Seikan Kaisha, Ltd., Tokyo, Japan

[21] Appl. No.: 875,889

[22] Filed: Feb. 7, 1978

[51] Int. Cl.² ............... B65D 25/14; B65D 25/34; B32B 15/08; B32B 27/38
[52] U.S. Cl. ............... 220/75; 220/1 BC; 525/423; 220/456; 220/458; 260/831; 426/113; 426/126; 426/131; 428/35; 428/414; 428/416; 428/418; 428/460; 428/475; 428/474
[58] Field of Search ......... 428/416, 475.5, 474.4, 428/35, 414, 418, 460; 220/454, 455, 456, 458, 459, 1 BC, 75; 260/837 R, 831; 426/113, 126, 131

[56] References Cited

U.S. PATENT DOCUMENTS

| | | | |
|---|---|---|---|
| 3,663,354 | 5/1972 | Meno | 428/416 |
| 3,703,434 | 11/1972 | Schaaf | 428/349 |
| 3,936,342 | 2/1976 | Matsubara | 428/416 |
| 3,993,841 | 11/1976 | Matsubara | 428/416 |
| 4,035,436 | 7/1977 | Matsubara | 428/416 |

*Primary Examiner*—Ellis P. Robinson
*Attorney, Agent, or Firm*—Diller, Ramik & Wight

[57] ABSTRACT

A bonded can having a high hot water resistance, which consists of a metal material having both the confronting side edges bonded together by a linear polyamide adhesive through an epoxy-phenolic resin undercoating composition, wherein said epoxy-phenolic resin undercoating composition comprises 50 to 95% by weight of an epoxy resin having a number average molecular weight of 800 to 5500, which is obtained by condensation of an epihalohydrin with bisphenol A, and 5 to 50% by weight of a resol-type phenol-aldehyde resin having a number average molecular weight of 200 to 1000, which is obtained by reacting a mixed phenol comprising 65 to 98% by weight of a dihydric phenol represented by the following general formula:

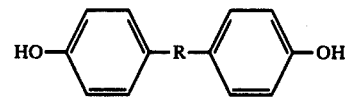

wherein

R stands for a bridging group or is a direct bond, and 2 to 35% by weight of a monohydric phenol, with an aldehyde in the presence of a basic catalyst.

This bonded can can resist retort sterilization conducted at 122° to 135° C. without substantial reduction of the peel strength of the bonded portion.

10 Claims, 1 Drawing Figure

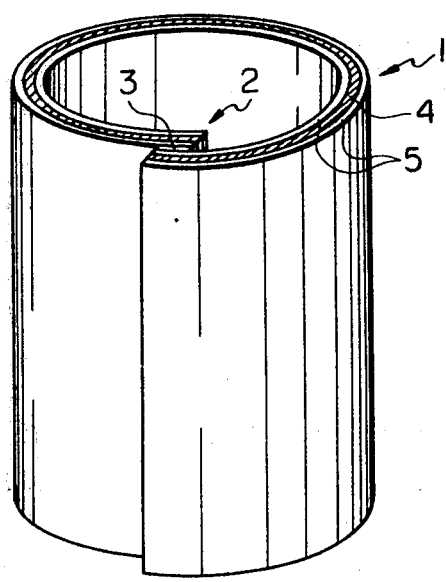

BONDED CAN HAVING HIGH HOT WATER RESISTANCE AND UNDERCOATING COMPOSITION FOR USE IN PRODUCTION THEREOF

BACKGROUND OF THE INVENTION (1) Field of the Invention

The present invention relates to a bonded can excellent in the resistance to hot water and also to an undercoating composition for use in manufacture of this bonded can. More particularly, the invention relates to a bonded can in which a portion of a can body bonded by an adhesive is prevented from deterioration even under such conditions that the bonded portion falls in contact with hot water or steam, and also to an undercoating composition for use in manufacture of such bonded can.

(2) Description of the Prior Art

In the field of manufacture of cans, so-called tin-free steels (TFS) such as chromium-plated steel plates and chromic acid-treated steel plates having a chromium oxide film on the surface have been broadly used instead of tin-plated steel plates as metal materials for production of cans. Since soldering of these tin-free metal materials is very difficult, a side seam of a can body is mainly formed according to a method comprising bonding both the confronting side edges of a coated metal material for a can body to each other by an organic adhesive such as a polyamide. According to this known bond-seaming method, as disclosed in the specification of U.S. Pat. No. 3,663,354 to Ueno et al., an undercoating composition such as an epoxy-phenolic resin is first applied to both the surface of a metal material for a can body, melting a polyamide type adhesive located between both the confronting side edges of the metal material, and cooling and solidifying the melt under application of a pressure to bond both the side edges and form a can body. In short, according to this known method, in the bonded portion of the can body, the side edges are bonded to each other by the polyamide adhesive through the undercoat of an epoxy-phenolic resin coated on the surfaces of the metal material.

The bonded portion of a known bonded can prepared according to such known method has a satisfactory bonding strength under normal conditions and can sufficiently resist the pressure of a content having a spontaneous pressure such as a carbonated drink. However, the bonded portion of this known can is still insufficient in the resistance to hot water. In case of carbonated drinks, filling of a content into a can body is ordinarily carried out in a cold state, and since the content per se is acidic, a severe sterilization treatment need not ordinarily be performed for preservation of the content. Therefore, when a carbonated drink or the like is filled, the hot water resistance of the bonded portion is not particularly significant. However, in case of other various foods and drinks, for example, fruit juices and processed foods, from the viewpoint of preservation of contents, it is necessary to perform a severe heat sterilization treatment or a retort sterilization treatment or to carry out filling of contents in a hot state, and therefore, the bonded portion is required to have a high resistance to hot water. More specifically, if the bonded portion is poor in the resistance to hot water, the can body is readily broken at the heat sterilization or air tightness is lost in the content during preservation. This tendency is conspicuous when the interior of the can is kept in vacuum or under a reduced pressure.

On the other hand, bonded cans are advantageous in various points. For example, the kind of the metal material to be used is not particularly critical, and the can manufacturing speed, namely the speed of formation of side seams, is very high and the productivity is therefore very high. Accordingly, if a can body provided with a side seam formed by an adhesive and having a high hot water resistance be obtained, it is apparent that various advantages will be attained as regards the manufacturing cost and the problem of the resource.

BRIEF SUMMARY OF THE INVENTION

We found that the hot water resistance of a bonded portion of a bonded can is most influenced by an undercoating composition to be applied to a metal material and that in each of bonded cans formed by using known epoxy-phenolic undercoating compositions, the bonded portion cannot resist hot water or steam heated at 125° C. at all but when a novel undercoating composition comprising specific resol type phenol-adehyde resin and epoxy resin described hereinafter at a specific ratio is used for production of a bonded can, the bonded portion which can resist hot water or steam heated above 125° C. can be obtained.

The higher is the temperature that can be resisted by the bonded portion of a bonded can, the more advantages can be attained with respect to maintenance of flavor and taste of the canned content. It is known that the time necessary for annihilating spores of bacteria may ordinarily be shortened as the sterilization temperature is high, and it also is known that the flavor and texture of the filled food and dyes and vitamins contained in the filled food are degraded and destroyed substantially in proportion to the sterilization time. Accordingly, as the temperature of hot water or steam that the bonded portion can resist is higher, the sterilization treatment can be performed at a higher temperature and completed in a shorter time, and it is possible to preserve the filled content for a longer period of time without degradation and destruction of the flavor and texture of the filled content and dyes and vitamins contained in the filled content.

It is therefore a primary object of the present invention to provide a novel, hot water-resistant undercoating composition which is applied to the surface of a metal material prior to bonding of the metal material for formation of a can body.

Another object of the present invention is to provide a bonded can in which a portion bonded by an adhesive can resist hot water or steam heated at high temperatures, especially high temperatures exceeding 125° C., and a novel undercoating composition to be used for manufacture of such bonded can.

Still another object of the present invention is to provide a bonded can in which reduction of the peel strength in a portion bonded by an adhesive is extremely diminished at the heat sterilization step or when a content is filled in a hot state and reduction of the peel strength in the bonded portion with the lapse of time is controlled to a very low level while the content-filled can is preserved for a long time, and a novel undercoating composition to be used for manufacture of such bonded can.

In accordance with a fundamental aspect of the present invention, there is provided an undercoating composition for production of a bonded can having a high resistance to hot water, which comprises (1) 50 to 95% by weight of an epoxy resin having a number average molecular weight of 800 to 5500, which is formed by condensation of an epihalohydrin with bisphenol A and (2) 5 to 50% by weight of a resol type phenol-aldehyde resin having a number average molecular weight of 200 to 1000, which is obtained by reacting a mixed phenol comprising (a) 65 to 98% by weight of a dihydric phenol represented by the following general formula:

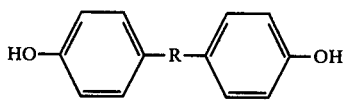 (I)

wherein

R stands for a divalent bridging group or is a direct bond, and (b) 2 to 35% by weight of a monohydric phenol, with an aldehyde in the presence of a basic catalyst, wherein said components (1) and (2) may be present in the form of a precondensate according to need.

In accordance with another aspect of the present invention, there is provided a bonded can having a high resistance to hot water, which consists of a metal material provided with a layer of said undercoating composition, which is lap-seamed and bonded through a polyamide adhesive.

Referring to the accompanying drawing illustrating the structure of the bonded can of the present invention, the bonded can consists of a can body formed by bonding a can body blank 1 at a side seam 2. This side seam 2 includes side edges of the can body blank 1 lapped and bonded through a polyamide adhesive 3. This can body blank 1 is composed of a metal material 4 such as tin-free steel (TFS), on the surface of which a layer 5 of an epoxy-phenolic resin undercoat having a specific composition described hereinafter has been formed prior to bonding by the polyamide adhesive 3. Both the side edges of the can blank 1 are bonded together through this undercoating layer 5 by the polyamide adhesive.

The present invention will now be described in detail.

DETAILED DESCRIPTION OF THE PREFERRED EMBODIMENTS

Phenol-Aldehyde Resin Component

In the dihydric phenol (a) represented by the above general formula (I) that is used for the preparation of the resol type phenol-aldehyde resin (2), R represents a divalent bridging group or is a direct bond. As the divalent bridging group R, there can be mentioned, for example, an alkylidene group of the formula $-CR^1R^2-$ in which $R^1$ and $R^2$ stands for a hydrogen or halogen atom or an alkyl or perhaloalkyl group having up to 4 carbon atoms, a group $-O-$, a group $-S-$, a group $-SO-$, a group $-SO_2-$ and a group $-NR^3-$ in which $R^3$ stands for a hydrogen atom or an alkyl group having up to 4 carbon atoms. Among these groups, an alkylidene or ether group is ordinarily preferred. As preferred examples of the dihydric phenol (a), there can be mentioned 2,2-bis(4-hydroxyphenyl)propane (bisphenol A), 2,2-bis(4-hydroxyphenyl)butane (bisphenol B), 1,1-bis(4-hydroxyphenyl)ethane, bis(4-hydroxyphenyl)methane (bisphenol F), 4-hydroxyphenylether and p-(4-hydroxyphenyl)phenol. Among them, bisphenol A and bisphenol B are especially preferred.

As the monohydric phenol (b) that is used for preparation of the resol type phenol-aldehyde resin (2), any of monohydric phenols that have been used for production of resins of this kind can be used in the present invention. In general, however, it is preferred to use at least one member selected from bifunctional phenols represented by the following general formula:

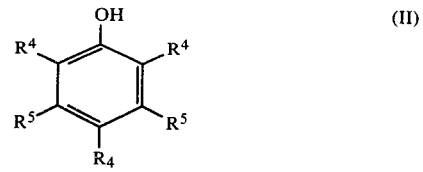 (II)

wherein $R^4$ stands for a hydrogen atom or an alkyl or alkoxy group having up to 4 carbon atoms with the proviso that two of three $R^4$'s stand for a hydrogen atom and one of them stands for an alkyl or alkoxy group having up to 4 carbon atoms, and $R^5$ stands for a hydrogen atom or an alkyl group having up to 4 carbon atoms.

As such bifunctional phenol, there can be mentioned, for example, o-cresol, p-cresol, p-tert-butylphenol, p-ethylphenol, 2,3-xylenol and 2,5-xylenol. In addition, trifunctional phenols such as phenol (carbolic acid), m-cresol, m-ethylphenol, 3,5-xylenol and m-methoxyphenol, monofunctional phenols such as 2,4-xylenol and 2,6-xylenol, and other bifunctional phenols such as p-tert-amylphenol, p-nonylphenol, p-phenylphenol and p-cyclohexylphenol may be used singly or in combination with the above-mentioned bifunctional phenols represented by the general formula (II) for production of phenol-aldehyde resins.

In the undercoating composition that is used in the present invention, in order to improve the hot water resistance of the bonded portion, it is very important that a phenol-aldehyde resin obtained by using a combination (a) the dihydric phenol of the general formula (I) and (b) the above-mentioned monohydric phenol at an (a)/(b) weight ratio of from 98/2 to 65/35, especially 95/5 to 75/25, should be used as one component of the undercoating composition. As will be apparent from the data shown in Table 2 given hereinafter, if the amount of the dihydric phenol (a) is outside the above range specified in the present invention, a bonded can formed by using the resulting undercoating composition tends to break down at a treatment with hot water above 125° C., and the peel strength of the bonded portion is drastically reduced by the hot water treatment and reduction of the peel strength of the bonded portion after the hot water treatment becomes conspicuous with the lapse of time. This tendency is similarly observed, as shown in Table 1 given hereinafter, when a dihydric phenol other than the dihydric phenol of the general formula (I), for example, resorcinol, is used as the dihydric phenol. In contrast, when a dicyclic dihydric phenol represented by the general formula (I) and a monohydric phenol are used at the above-mentioned specific ratio for production of the phenol-aldehyde resin component of the undercoating composition according to the present invention, the bonded portion of the resulting bonded can has such a high hot water resistance that cannot be attained in any of conventional bonded cans at all. Namely, the bonded portion can sufficiently resist a treatment with hot water above 125° C. and reduction of the peel strength by the hot water treatment or with the lapse of time can be controlled to a very low level.

It is known that an undercoating composition (primer) for a bonded can is formed by combining a resol-type phenol-aldehyde resin containing a dicyclic dihydric phenol such as bisphenol A with an epoxy resin.

For example, the above-mentioned specification of U.S. Pat. No. 3,663,354 discloses that a primer comprising an epoxy resin and a resol-type phenol-aldehyde resin formed by condensing a mixed phenol consisting of 50 to 10% by weight of bisphenol A with formaldehyde is very valuable as a primer for improving the adhesion between a metal and a polyamide adhesive, and it also is taught that when a resol-type phenol-aldehyde resin formed by using bisphenol A alone instead of the above-mentioned mixed phenol is used and combined with an epoxy resin, the adhesion between a metal and a polyamide adhesive is not improved at all.

More specifically, an undercoating composition comprising an epoxy resin and a resol-type phenol-aldehyde resin formed by using a polycyclic dihydric phenol such as bisphenol A alone as the phenol component is defective in that peeling is readily caused between the undercoating and the polyamide adhesive. For this reason, in conventional undercoating compositions, the amount of a polycyclic phenol such as bisphenol A is reduced to a relatively low level such as up to 50% by weight based on the total phenol component.

We found that when a primer or undercoating composition comprising an epoxy resin and a resol-type phenol-aldehyde resin obtained by using a larger amount of a monocyclic phenol and a smaller amount of a polycyclic phenol such as bisphenol A is used for manufacture of bonded cans, however, the bonding between the metal material and the undercoating is degraded at a retort sterilization conducted at high temperatures. On the other hand, when an undercoating composition is prepared by combining an epoxy resin with a resol-type phenol-aldehyde resin having a number average molecular weight of 200 to 1000, which is obtained by using a mixed phenol comprising (a) a dihydric dicyclic phenol and (b) a monohydric phenol at the above-mentioned weight ratio, according to the present invention, and when it is used for manufacture of bonded cans, the above undercoating composition has an excellent adhesion to both the polyamide adhesive and the metal material and this adhesion is hardly degraded by the retort sterilization or during storage after the retort sterilization. In short, we succeeded for the first time in providing an undercoating composition for bonded cans which has such excellent adhesion characteristics by using a mixed phenol comprising the above-mentioned dihydric phenol (a) and monohydric phenol (b) at the above-mentioned specific weight ratio for synthesis of a resol-type phenol-aldehyde resin to be combined with an epoxy resin.

Formaldehyde (or paraformaldehyde) is especially preferred as the aldehyde component of the phenol-aldehyde resin. Of course, other aldehydes such as acetaldehyde, butylaldehyde and benzaldehyde may be used singly or in combination with formaldehyde.

The resol-type phenol-aldehyde resin that is used in the present invention is prepared by reacting a mixed phenol having the above-mentioned specific composition with an aldehyde in the presence of a basic catalyst so that the number average molecular weight of the resulting resin is 200 to 1000, especially 250 to 800.

In the present invention, from the viewpoint of the use of the above-mentioned dihydric dicyclic phenol of the general formula (I) in a specific amount, it is important that the number average molecular weight of the resulting phenol-aldehyde resin should not exceed 1000. If the number average molecular weight of the resulting phenol-aldehyde resin exceeds 1000, peeling is readily caused between the polyamide adhesive and the undercoating layer and the bonding between the undercoating layer and the metal material is readily degraded by the retort sterilization or during storage.

In the instant specification and appended claims, the number average molecular weight is one determined by a vapor pressure osmometer.

The molecular weight of a phenol-aldehyde resin is greatly changed by such factors as the kind of the phenol used, the amount used of the aldehyde, the kind of the catalyst, the reaction temperature and the reaction time, and it is very difficult to define these conditions collectively for production of a phenol-aldehyde resin having the above-mentioned number average molecular weight. Accordingly, practical reaction conditions are experimentally selected from the following general conditions so that the number average molecular weight of the resulting phenol-aldehyde resin is within the above-mentioned range.

In general, the aldehyde is used in an amount of at least 1 mole, especially 1.5 to 3.0 moles, per mole of the mixed phenol. Condensation is carried out ordinarily in an appropriate reaction medium and preferably in an aqueous medium. Any of basic catalysts that have heretofore been used for production of resol-type resins can be used in the present invention. Among them, there are preferably employed ammonia and hydroxides, oxides and basic salts of alkaline earth metals such as magnesium hydroxide, calcium hydroxide, barium hydroxide, calcium oxide, basic magnesium carbonate, basic magnesium chloride and basic magnesium acetate. The basic catalyst is made present in a reaction medium in a catalytic amount, especially 0.01 to 0.5 mole % based on the phenol component. Condensation conditions are appropriately selected from reaction temperatures of 60° to 130° C. and heating times of 10 minutes to 40 hours.

The resulting resin may be refined by known means. For example, the reaction product resin is extracted and separated from the reaction medium with a ketone, an alcohol or a hydrocarbon solvent or a mixture thereof, washing the recovered resin with water to remove unreacted substances according to need and removing water from the product by azeotropic distillation or precipitation to obtain a refined resol-type phenol-aldehyde resin that can be mixed with an epoxy resin.

It is ordinarily preferred that the so obtained resol-type phenol-aldehyde resin be combined with an epoxy resin as it is. If desired, however, it is possible to mix the phenol-aldehyde resin with an epoxy resin after it has been modified with at least one of known modifiers such as fatty acids, polymeric fatty acids, resin acids (rosins), drying oils and alkyd resins.

Epoxy Resin Component

In the present invention, an undercoating composition is prepared by combining the above-mentioned resol-type phenol-aldehyde resin with an epoxy resin having a number average molecular weight of 800 to 5500, especially 1400 to 5500, which is synthesized by condensing an epihalohydrin with bisphenol A [2,2-bis(4-hydroxyphenyl)propane]. This epoxy resin that is used in the present invention is represented by the following general formula:

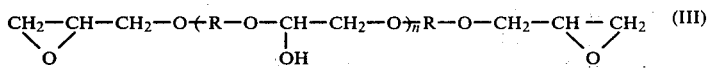

wherein R stands for the condensation residue of 2,2-bis(4-hydroxyphenyl)propane and n is a number selected so that the number average molecular weight of the resin is 800 to 5500.

When the number average molecular weight of the epoxy resin is lower than 800, as will be apparent from data shown in Table 4 given hereinafter, the bonding strength between the undercoating layer and the metal material is low, and the bonded portion of the resulting bonded can is readily peeled if it falls in contact with hot water. When the number average molecular weight of the epoxy resin is higher than 5500, no sufficient bonding strength can be obtained, and if the resulting bonded can falls in contact with hot water, the peel strength is drastically lowered and the can is readily broken. The molecular weight of the epoxy resin referred to is the average molecular weight. Accordingly, in the present invention, it is possible to combine an epoxy resin for undercoating compositions which has a relatively low degree of polymerization with a linear epoxy resin having a high molecular weight, namely a phenoxy resin (high-molecular-weight thermoplastic epoxy resin), so that the average molecular weight is in the above-mentioned range, and to use the resulting mixture as the epoxy resin.

Undercoating Composition

In the present invention, in order to improve the adhesion of the undercoating layer to the metal material or polyamide adhesive and enhance the hot water resistance of the bonded can, it is very important that the above-mentioned bisphenol A type epoxy resin (1) should be combined with the above-mentioned resol-type phenol-aldehyde resin (2) at a (1)/(2) weight ratio of from 95/5 to 50/50, especially from 90/10 to 60/40, to obtain an undercoating composition. If the amount of the resol-type phenol-aldehyde resin is smaller than 5% by weight based on the sum of the resins (1) and (2), the curing speed of the undercoating composition is low and the degree of curing is insufficient, and as will be apparent from data shown in Table 3 given hereinafter, the peel strength of the resulting bonded can is low and it is often reduced to zero on contact with hot water. When the amount of the phenol-aldehyde resin exceeds 50% by weight, the peel strength of the resulting bonded can is slightly higher than in the above-mentioned case, but it is often reduced to substantially zero just after contact with hot water or after passage of a certain time from contact with hot water.

In the present invention, the above-mentioned epoxy resin and phenol-aldehyde resin may be used as the undercoating composition in the state mixed and dissolved in a ketone, an ester, an alcohol, a hydrocarbon solvent or a mixture thereof, but in general, it is preferred that the resins be precondensed in such dissolved state at 80° to 130° C. for about 1 to about 10 hours and the resulting precondensate solution be used as the undercoating composition.

Bonded Can

In the present invention, by selecting a resol-type phenol-aldehyde resin comprising the above-mentioned dicyclic dihydric phenol and monohydric phenol at a specific weight ratio and obtaining an undercoating composition by combining this resol-type phenol-aldehyde resin with an epoxy resin at a specific weight ratio, it is made possible to obtain a bonded can which can resist sufficiently hot water heated above 125° C., although such high hot water resistance cannot be attained at all by any of bonded cans prepared by using conventional undercoating compositions.

When a bonded can is prepared by using the undercoating composition of the present invention, the undercoating composition is first coated on the surface of a metal material for formation of a can body, and the resulting coating is then baked. As the metal material for formation of a can body, there can be used various metal materials for cans, such as steel plates (black plates), plated steel plates formed by plating the surface of a steel plate with zinc, tin, chromium or aluminum, and treated steel plates formed by subjecting the surface of a steel plate to a chemical treatment with chromic acid or phosphoric acid or to an anodic electrolysis treatment. Further, a composite metal material, formed by bonding and laminating a foil of a metal such as aluminum onto an organic substrate such as a film of a resin such as polyolefin or a paper board, can be used as the metal material. A specific kind of the metal material to be used is appropriately selected depending on the intended use of the resulting bonded can. In general, as the metal material excellent in the corrosion resistance and the adhesion to the coating, there is preferably employed a chromic acid-treated, anodically electrolyzed, steel plate comprising a steel plate substrate, a metallic chromium layer formed on the substrate and a hydrous chromium oxide layer formed on the metallic chromium layer, in which the metallic chromium layer is present in an amount of 0.1 to 2 mg/m$^2$ and the hydrous chromium oxide layer is present in an amount of 0.05 to 5 mg/m$^2$ as calculated as metallic chromium. The thickness of the metal material to be used for production of the bonded can is changed depending on the volume of the can body, the kind of the content and other factors, but it is generally preferred that the thickness be in the range of from 0.1 to 0.3 mm.

The above-mentioned metal material is degreased by trichloroethylene or other degreasing solvent according to need, and the undercoating composition of the present invention is applied in the form of a solution to the surface of the metal material according to known coating methods such as brush coating, spray coating, dip coating, roll coating, electrostatic coating and electrophoretic coating methods. The thickness of the undercoating layer is not particularly critical so far as the metal surface is uniformly coated with the undercoating composition, but in general, if the thickness of the undercoating layer is 1 to 15 microns, good results are obtained.

Then, the undercoating composition-applied metal material is formed into a cylindrical shape by optional means, and both the confronting side edges are seam-bonded by using a known adhesive, for example, a polyamide adhesive to form a lap seam, lock seam or lap-and-lock seam. As the polyamide adhesive, there are employed linear homopolyamides, copolyamides and modified polyamides having a relative viscosity (ηrel) of at least 1.5, especially at least 1.8, as measured with respect a 1% solution in 98% concentrated sulfuric acid. Polymer blends of two or more of these polyamides can also be used. As specific examples of such polyamide, there can be mentioned homopolyamides such as polyhexamethylene adipamide, polyhexamethylene sebacamide, polyhexamethylene dodecamide, polydodecamethylene dodecamide, poly-6-aminocaproic acid, poly-11-aminoundecanoic acid and poly-12-aminolauric acid, copolyamides consisting at least two members selected from constituent monomers of the foregoing homopolyamides, namely combinations of dicarboxylic acids and diamine salts or at least two ω-aminocarboxylic acids, and the foregoing homopolyamides and copolyamides modified with polymeric fatty acids or the like. From the viewpoint of the strength of the bonded portion, it is preferred that the polyamide adhesive to be used in the present invention be crystalline.

Various means may be adopted for interposing the polyamide adhesive between both the side edges of the coated metal material to be bonded. For example, a preformed tape of a polyamide adhesive is applied to both the side edges to be bonded or a molten polyamide in a tape-like form is melt-extruded and applied to the side edges to be bonded. Alternately, the polyamide adhesive can be applied in the form of a powder or solution to the side edges of the metal material to be bonded. The thickness of a layer of the polyamide adhesive applied to the side edges to be bonded is not particularly critical so far as the polyamide adhesive has uniform and tight contact with the undercoating layer formed on the metal material, but in general, it is preferred that the thickness of the polyamide adhesive layer be in the range of from 0.01 to 0.2 mm. The polyamide adhesive may be applied to one or both of the side edges of the coated metal material prior to the bonding operation or it may be interposed between both the side edges at the bonding operation.

Bonding of both the side edges of the metal material is accomplished by melting the polyamide adhesive located between both the confronting side edges of the metal material formed in a cylindrical shape, pressing both the side edges of the coated metal material under cooling and thereby solidifying the polyamide adhesive. A can body formed by such side-seam bonding is then subjected to known can-manufacturing processings such as notching processing, flanging processing and lid seaming processing, and a final can body is thus obtained.

When the undercoating composition of the present invention is used for manufacture of bonded cans, as will be apparent from the results of Examples given hereinafter, the side edges of the metal material are tightly bonded to each other by the adhesive through this undercoating layer and a bonded portion having a very high peel strength is formed, and this bonded portion can resist sufficiently such a severe hot water or steam sterilization treatmnet as carried out at 125° C. for 60 minutes. Further, even if the bonded can subjected to such severe sterilization treatment is then preserved for a long time, reduction of the peel strength with the lapse of time can be controlled to an extremely low level.

In retort-sterilized canned foods or drinks formed by using a bonded can, the bonding state is greatly influenced by the preservation temperature. For example, when such retorted canned foods or drinks are preserved at relatively low temperatures, e.g., 20° C. or lower, degradation of the bonding with the lapse of time is not so conspicuous, but when the preservation temperature is relatively high, e.g., 35° C. or higher, degradation of the bonding with the lapse of time is conspicuous. According to the present invention, however, by forming an undercoating layer of a specific composition on the metal material, even if the preservation temperature is relatively high, degradation of the bonding with the lapse of time can be remarkably controlled.

The bonded can prepared by using the undercoating composition of the present invention is therefore very valuable as a can to be subjected to a retort sterilization treatment conducted at high temperatures, for example, a sterilization treatment conducted at a temperature of 122° to 135° C. for 10 to 150 minutes under a pressure of 1.1 to 2.3 Kg/cm$^2$ (pressure gauge). Namely, the bonded can according to the present invention is very valuable as a can for preservation of various drinks such as fruit juices, fruit juice-mixed drinks and coffee, fruits, vegetables, marine products, meat products and processed foods thereof. Of course, the foregoing advantages can be similarly attained when the bonded can according to the present invention is used as a can subjected to a heat sterilization treatment conducted at a temperature lower than the temperature adopted in the above-mentioned high-temperature sterilization, for example, a sterilization treatment conducted at 110° to 121° C., or a can in which the content is filled in a hot state (for example, at the boiling temperature).

The present invention will now be described in detail by reference to the following Examples that by no means limit the scope of the invention.

EXAMPLE 1

This Example illustrates influences of the kinds and amounts of the dihydric phenol and monohydric phenol in a mixed phenol that is used for obtaining a resol-type phenol-aldehyde resin, on properties of the resulting bonded cans.

The metal plate used as the metal material was a chromic acid treated steel plate having a thickness of 0.24 mm ("Hi-Top" manufactured and sold by Toyo Kohan).

The adhesive used was a linear polyamide derived from 12-aminolauric acid and having a relative viscosity of 2.7 as measured with respect to a 1% solution in 98% concentrated sulfuric acid.

The undercoating composition was prepared in the following manner.

A 37% aqueous solution of formaldehyde was added to a mixed phenol indicated in Table 1. The amount of formaldehyde was 2.0 moles per mole of the mixed phenol. Then, the temperature was elevated to 65° C. to dissolve the mixed phenol in the aqueous solution. Then, a basic catalyst (magnesium hydroxide) was added to the solution, and reaction was carried out at 95° C. for several hours.

The reaction product was extracted with a mixed solvent comprising a ketone, an alcohol and a hydrocarbon solvent and washed with water and water was removed by azeotropic distillation or precipitation. The so obtained phenol-aldehyde resin was found to have a number average molecular weight of 250 to 500.

The so obtained solution of the resol-type phenol-aldehyde resin was mixed with a solution separately prepared by dissolving an epoxy resin having a number average molecular weight of 3750 ("Epikote 1009"

manufactured and sold by Shell Chemicals) in a mixed solvent comprising a ketone, an ester, an alcohol and a hydrocarbon solvent. The epoxy resin/phenol-aldehyde resin mixing weight ratio was 75/25. The resulting mixture was heated under reflux (110° C.) to effect precondensation. Thus, the undercoating composition was prepared.

The so prepared undercoating composition was coated on both the surfaces of the above-mentioned steel plate (Hi-Top) and cured at 150° to 230° C. for 1 to 20 minutes to obtain a cured coating layer having a thickness of 1 to 15μ.

The so coated metal plate was cut in a can blank for a can body having a diameter of 3 1/12 in. and an inner volume of 454.4 ml, and the can blank was rounded by three rolls. Then, a tape of the above-mentioned polyamide adhesive having a thickness of about 100μ and a width of about 8 mm was inserted between lapped side edges to be bonded. The side edges of the can blank to be bonded were heated at 230° C., compressed for about 50 milliseconds and then cooled to obtain a metal can body. The lap width of the bonded portion was 5 mm.

A lid was double-seamed to one opening of the flanged can body, and warm water maintained at 95° C. was filled and another lid was double-seamed to the other opening. Then, the filled can was heat-treated at 125° C. for 60 minutes. This heat treatment test was conducted with 20 can bodies for each undercoating composition. The presence or absence of broken can bodies was examined, and the peel strength of the bonded portion was measured at 25° C. before and after the heat treatment. Further, the peel strength of the bonded portion after storage of 6 months, 1 year or 2 years at 37° C. was measured at 25° C. Obtained results are shown in Table 1.

Table 1

| Run No. | Mixed Phenol | | | |
|---|---|---|---|---|
| | Dihydric Phenol | | Monohydric Phenol | |
| | Kind | Amount (wt. %) | Kind | Amount(wt. %) |
| 1 | 2,2-bis(4-hydroxyphenyl)propane | 90 | p-cresol | 10 |
| 2 | " | 80 | o-cresol | 20 |
| 3 | " | 70 | p-cresol | 15 |
| | | | o-cresol | 15 |
| 4 | " | 75 | p-tert-butylphenol | 25 |
| 5 | " | 80 | p-ethylphenol | 20 |
| 6 | " | 80 | phenol | 20 |
| 7 | " | 80 | m-cresol | 20 |
| 8 | 2,2-bis(4-hydroxyphenyl)butane | 85 | p-cresol | 15 |
| 9 | " | 80 | 2,3-xylenol | 20 |
| 10 | 1,1-bis(4-hydroxyphenyl)ethane | 95 | o-cresol | 5 |
| 11 | " | 70 | p-phenylphenol | 30 |
| 12 | bis(4-hydroxyphenyl)methane | 80 | p-tert-amylphenol | 20 |
| 13 | 4-hydroxyphenylether | 75 | 2,5-xylenol | 25 |
| 14 | " | 70 | p-cresol | 30 |
| 15 | p-(4-hydroxyphenyl)phenol | 80 | p-cresol | 20 |
| 16 | resorinol | 70 | p-cresol | 30 |
| 17 | 2,2-bis(4-hydroxyphenyl)propane | 40 | o-cresol | 60 |
| 18 | " | 30 | o-cresol | 35 |
| | " | | phenol | 35 |
| 19 | " | 20 | phenol | 80 |

| Run No. | Peel Strength (Kg/cm) of Bonded Portion | | | | | Number of Can Bodies Broken at Heat Treatment at 125° C. for 60 minutes | Remarks |
|---|---|---|---|---|---|---|---|
| | before heat treatment | after heat treatment at 125° C. for 60 min. | after 6 month's storage | after 1 year's storage | after 2 year's storage | | |
| 1 | 23 | 22 | 20 | 16 | 10 | 0/20 | present invention |
| 2 | 24 | 22 | 20 | 17 | 11 | 0/20 | " |
| 3 | 25 | 24 | 21 | 17 | 11 | 0/20 | " |
| 4 | 25 | 23 | 20 | 17 | 10 | 0/20 | " |
| 5 | 23 | 22 | 20 | 16 | 11 | 0/20 | " |
| 6 | 25 | 24 | 22 | 18 | 13 | 0/20 | " |
| 7 | 25 | 23 | 21 | 17 | 10 | 0/20 | " |
| 8 | 24 | 22 | 20 | 16 | 11 | 0/20 | " |
| 9 | 24 | 22 | 20 | 16 | 11 | 0/20 | " |
| 10 | 24 | 22 | 21 | 17 | 12 | 0/20 | " |
| 11 | 25 | 22 | 19 | 16 | 10 | 0/20 | " |
| 12 | 24 | 22 | 20 | 17 | 12 | 0/20 | " |
| 13 | 23 | 21 | 18 | 15 | 10 | 0/20 | " |
| 14 | 23 | 21 | 19 | 16 | 11 | 0/20 | " |
| 15 | 24 | 20 | 18 | 15 | 10 | 0/20 | " |
| 16 | 20 | 10 | 6 | 3 | 0 | 13/20 | comparison |
| 17 | 24 | 0 | 0 | 0 | 0 | 20/20 | " |
| 18 | 23 | 0 | 0 | 0 | 0 | 20/20 | " |
| 19 | 23 | 13 | 8 | 4 | 2 | 10/20 | " |

EXAMPLE 2

This Example illustrates influences of the mixing ratio of the dihydric phenol and monohydric phenol in a mixed phenol that is used for the preparation of a resol-type phenol-aldehyde resin, on properties of the resulting bonded can.

As the dihydric phenol, 2,2-bis(4-hydroxyphenyl)propane (bisphenol A) was used and p-cresol was used as the monohydric phenol, and they were mixed at a weight ratio shown in Table 2.

A resol-type phenol-aldehyde resin having a number average molecular weight of 200 to 450 was prepared from the above mixed phenol in the same manner as described in Example 1. An epoxy resin having a number average molecular weight of 2650 ("Epikote 1007" manufactured and sold by Shell Chemicals) was mixed with the so prepared phenol-aldehyde resin. The epoxy resin/phenol-aldehyde resin mixing weight ratio was 75/25.

By using the so prepared undercoating composition, a bonded can was prepared in the same manner as described in Example 1. The metal plate and polyamide adhesive used were the same as those used in Example 1. The resulting bonded can was tested in the same manner as described in Example 1 to obtain results shown in Table 2.

resin in an undercoating composition on properties of the resulting bonded can.

The resol-type phenol aldehyde resin was prepared by reacting a mixed phenol comprising 80% by weight of 2,2-bis(4-hydroxyphenyl)butane (bisphenol B) and 20% by weight of o-cresol with a 37% aqueous solution of formaldehyde in the presence of a basic catalyst. The amount of formaldehyde was 2.5 moles per mole of the mixed phenol. The number average molecular weight of the resulting resol-type phenol-aldehyde resin was 350.

The so prepared phenol-aldehyde resin was mixed with the same epoxy resin as used in Example 1 at a mixing ratio shown in Table 3. By using the so obtained undercoating composition, a bonded can was prepared in the same manner as described in Example 1. The metal plate and polyamide adhesive used were the same as those used in Example 1. The resulting bonded can Table 2

| Run No. | Mixed Phenol | | | |
|---|---|---|---|---|
| | Dihydric Phenol | | Monohydric Phenol | |
| | Kind | Amount (wt. %) | Kind | Amount (wt. %) |
| 1 | 2,2-bis(4-hydroxyphenyl)propane | 100 | p-cresol | 0 |
| 2 | " | 98 | " | 2 |
| 3 | " | 95 | " | 5 |
| 4 | " | 90 | " | 10 |
| 5 | " | 80 | " | 20 |
| 6 | " | 75 | " | 35 |
| 7 | " | 60 | " | 40 |
| 8 | " | 50 | " | 50 |
| 9 | " | 30 | " | 70 |
| 10 | " | 10 | " | 90 |

| Run No. | Peel Strength (Kg/cm) of Bonded Portion | | | | | Number of Can Bodies Broken by Heat Treatment at 125° C. for 60 minutes | Remarks |
|---|---|---|---|---|---|---|---|
| | before heat treatment | after heat treatment at 125° C. for 60 minutes | after 6 months' storage | after 1 year's storage | after 2 years' storage | | |
| 1 | 18 | 13 | 10 | 7 | 3 | 5/20 | comparison |
| 2 | 20 | 17 | 15 | 12 | 9 | 1/20 | present invention |
| 3 | 22 | 19 | 17 | 15 | 11 | 0/20 | " |
| 4 | 23 | 22 | 20 | 16 | 12 | 0/20 | " |
| 5 | 24 | 22 | 19 | 15 | 10 | 0/20 | " |
| 6 | 25 | 21 | 17 | 12 | 8 | 0/20 | " |
| 7 | 26 | 17 | 12 | 8 | 3 | 5/20 | comparison |
| 8 | 26 | 15 | 10 | 5 | 2 | 15/20 | " |
| 9 | 25 | 0 | 0 | 0 | 0 | 20/20 | " |
| 10 | 25 | 0 | 0 | 0 | 0 | 20/20 | " |

EXAMPLE 3

This Example illustrates influences on the mixing ratio of the resol-type phenol-aldehyde resin and epoxy was tested in the same manner as described in Example 1 to obtain results shown in Table 3.

Table 3

| Run No. | Epoxy Resin Phenol-Aldehyde Resin Mixing Ratio (weight) | Peel Strength (Kg/cm) of Bonded Portion | | | | | Number of Can Bodies Broken at Heat Treatment at 125° C. for 60 minutes | Remarks |
|---|---|---|---|---|---|---|---|---|
| | | before heat treatment | after heat treatment at 125° C. for 60 min. | after 6 months' storage | after 1 year's storage | after 2 years' storage | | |
| 1 | 98/2 | 7 | 0 | 0 | 0 | 0 | 20/20 | comparison |
| 2 | 95/5 | 10 | 8 | 7 | 6 | 6 | 3/20 | present invention |
| 3 | 90/10 | 17 | 14 | 13 | 11 | 10 | 0/20 | " |
| 4 | 80/20 | 25 | 23 | 21 | 17 | 13 | 0/20 | " |
| 5 | 70/30 | 26 | 24 | 22 | 18 | 14 | 0/20 | " |
| 6 | 50/50 | 23 | 18 | 15 | 11 | 8 | 1/20 | " |
| 7 | 30/70 | 15 | 0 | 0 | 0 | 0 | 20/20 | comparison |

Table 3-continued

| Run No. | Epoxy Resin Phenol-Aldehyde Resin Mixing Ratio (weight) | Peel Strength (Kg/cm) of Bonded Portion | | | | | Number of Can Bodies Broken at Heat Treatment at 125° C. for 60 minutes | Remarks |
|---|---|---|---|---|---|---|---|---|
| | | before heat treatment | after heat treatment at 125° C. for 60 min. | after 6 months' storage | after 1 year's storage | after 2 years' storage | | |
| 8 | 10/90 | 10 | 0 | 0 | 0 | 0 | 20/20 | " |

EXAMPLE 4

This Example illustrates influences of the number average molecular weight of the epoxy resin in an undercoating composition on properties of the bonded can.

The same phenol-aldehyde resin as used in Example 3 was mixed with an epoxy resin having a number average molecular weight indicated in Table 4 to obtain an undercoating composition. By using the so prepared undercoating composition, a bonded can was prepared in the same manner as described in Example 1. The metal plate and polyamide adhesive used were the same as those used in Example 1. The bonded can was tested in the same manner as described in Example 1 to obtain results shown in Table 4.

Table 4

| Run No. | Number Average Molecular Weight of Epoxy Resin | Peel Strength (Kg/cm) of Bonded Portion | | | | | Number of Can Bodies Broken at Heat Treatment at 125° C. for 60 min. | Remarks |
|---|---|---|---|---|---|---|---|---|
| | | before heat treatment | after heat treatment at 125° C. for 60 min. | after 6 months' storage | after 1 year's storage | after 2 years' storage | | |
| 1 | 500 | 5 | 0 | 0 | 0 | 0 | 20/20 | comparison |
| 2 | 800 | 15 | 10 | 8 | 7 | 7 | 1/20 | present invention |
| 3 | 1,400 | 20 | 15 | 12 | 10 | 8 | 0/20 | " |
| 4 | 2,650 | 24 | 23 | 21 | 18 | 13 | 0/20 | " |
| 5 | 3,750 | 25 | 23 | 20 | 17 | 12 | 0/20 | " |
| 6 | 4,500 | 23 | 21 | 18 | 15 | 12 | 0/20 | " |
| 7 | 5,500 | 20 | 17 | 15 | 13 | 10 | 0/20 | " |
| 8 | 10,000 | 12 | 8 | 3 | 1 | 0 | 7/20 | comparison |
| 9 | 30,000 | 10 | 3 | 0 | 0 | 0 | 20/20 | " |

EXAMPLE 5

This Example illustrates influences of the number average molecular weight of the resol-type phenol-aldehyde resin in an undercoating composition on properties of the bonded cans.

A 37% aqueous solution of formaldehyde was added to a mixed phenol comprising 75% by weight of 2,2-bis(4-hydroxyphenyl)propane (bisphenol A) and 25% by weight of p-cresol. The amount of formaldehyde was 2.0 moles per mole of the mixed phenol. The temperature of the mixture was elevated to 65° C. to dissolve the mixed phenol in the aqueous solution. Then, 25% aqueous ammonia was added to the solution. The amount of ammonia was 0.1 mole per mole of the mixed phenol. Reaction was carried out at 95° C. for 10 minutes to 8 hours to obtain a resol-type phenol-aldehyde resin having a number average molecular weight indicated in Table 5. The so obtained phenol-aldehyde resin was mixed with an epoxy resin having a number average molecular weight of 3750 ("Epikote 1009" manufactured and sold by Shell Chemicals) to form an undercoating composition. The epoxy resin/phenol-aldehyde resin mixing weight ratio was 80/20. By using the so prepared undercoating composition, a bonded can was prepared in the same manner as described in Example 1. The metal plate and polyamide adhesive used were the same as those as used in Example 1. The bonded can was tested in the same manner as described in Example 1 to obtain results shown in Table 5.

Table 5

| Run No. | Number Average Molecular Weight of Resol-Type Phenol-Aldehyde Resin | Peel Strength (Kg/cm) of Bonded Portion | | | | | Number of Can Bodies Broken at Heat Treatment at 125° C. for 60 minutes | Remarks |
|---|---|---|---|---|---|---|---|---|
| | | before heat treatment | after heat treatment at 125° C. for 60 min. | after 6 months' storage | after 1 year's storage | after 2 years' storage | | |
| 1 | 190 | 8 | 0 | 0 | 0 | 0 | 20/20 | comparison |
| 2 | 200 | 23 | 22 | 20 | 18 | 13 | 0/20 | present invention |
| 3 | 255 | 26 | 24 | 22 | 20 | 15 | 0/20 | " |
| 4 | 380 | 26 | 24 | 22 | 20 | 14 | 0/20 | " |
| 5 | 540 | 23 | 21 | 19 | 17 | 12 | 0/20 | " |
| 6 | 660 | 20 | 17 | 15 | 13 | 10 | 0/20 | " |
| 7 | 850 | 18 | 15 | 13 | 11 | 8 | 0/20 | " |
| 8 | 1,040 | 15 | 10 | 8 | 6 | 3 | 2/20 | comparison |
| 9 | 1,400 | 10 | 0 | 0 | 0 | 0 | 20/20 | " |

EXAMPLE 6

A 37% aqueous solution of formaldehyde was added to a mixed phenol comprising 85% by weight of 2,2-bis(4-hydroxyphenyl)propane (bisphenol A) and 15% by weight of o-cresol. The amount of formaldehyde was 2.0 moles per mole of the mixed phenol. The temperature of the mixture was elevated to 65° C. to dissolve the mixed phenol in the aqueous solution. Then, 25% aqueous ammonia was added to the solution and reaction was carried out at 95° C. for 3 hours. The amount of ammonia was 0.1 mole per mole of the mixed phenol.

The resulting condensation product was extracted with a mixed solvent comprising 30 parts of methylisobutyl ketone, 20 parts of cyclohexanone and 50 parts of xylene and washed with water. Water was removed by precipitation.

In the so prepared resol-type phenol-aldehyde resin solution, the solid content was 30% by weight, and the resin was found to have a number average molecular weight of 375.

Separately, an epoxy resin having a number average molecular weight of 3750 ("Epikote 1009" manufactured and sold by Shell Chemicals) was dissolved in the same mixed solvent as described above.

Both the solutions were mixed to form a solution having a solid content of 33%, in which the epoxy resin/phenol-aldehyde resin weight ratio was 75/25. The solution was heated at 110° C. for 3 hours to effect precondensation and obtain an undercoating composition in the form of a solution.

A can blank for a can body having a diameter of 2 11/12 in. and an inner volume of 318.2 ml was formed by cutting a chromic acid treated steel plate having a thickness of 0.23 mm ("Hi-Top" manufactured and sold by Toyo Kohan), and the above undercoating composition was coated on both the surfaces of the can blank in a thickness of about 5µ and was cured at 205° C. for 10 minutes.

A film of poly-12-aminolauric acid having a relative viscosity of 2.3, which had a thickness of 50µ and a width of 8 mm, was located on both the side edges of the coated can blank to be bonded, and the film was compressed at 230° C. for 2 seconds and then cooled.

The resulting can blank having a polyamide coating on both the side edges to be bonded was rounded by three rolls so that the polyamide-coated nd faces confronted each other. Then, the polyamide-coated faces were lapped, heated for 50 milliseconds by high frequency heating, compressed and cooled to obtain a can body.

The peel strength of the lap seam of the bonded can was 24 Kg/cm. A lid was double-seamed to one opening of the can body, and warm water maintained at 95° C. was filled in the can body and a lid was double-seamed to the other opening.

When the filled can was subjected to a heat treatment at 130° C. for 60 minutes, the number of broken can bodies was zero (1000 can bodies were tested). The peel strength of the bonded portion after the heat treatment was 22 Kg/cm as measured at 20° C. The peel strengths of the bonded portion after 6 months' storage, 1 year's storage and 2 years' storage at 37° C. were 20, 18 and 13 Kg/cm, respectively, as measured at 20° C. In each case, breakage of the bonded portion was not observed, and a good vacuum state was maintained in the can and the inner pressure was lower by at least 40 cmHg than the atmospheric pressure.

EXAMPLE 7

An undercoating composition was prepared in the same manner as described in Example 6 except the following changes. A mixture comprising 90% by weight of bis(4-hydroxyphenyl)methane (bisphenol F) and 10% by weight of p-tert-butylphenol was used as the mixed phenol composition and sodium carbonate was used in an amount of 0.01 mole per mole of the mixed phenol as the catalyst. The number average molecular weight of the resulting phenol-aldehyde resin was 320. An epoxy resin having a number average molecular weight of 2650 ("Epikote 1007" manufactured and sold by Shell Chemicals) was used as the epoxy resin. The epoxy resin/phenol-aldehyde resin mixing weight ratio was 70/30. Precondensation was carried out at 110° C. for 5 hours.

The undercoating composition was coated on both the degreased surfaces of a cold-rolled steel plate and cured at 210° C. for 10 minutes. By using a film of poly-6-aminocaproic acid having a relative viscosity of 2.25 as a linear polyamide adhesive, a can body was prepared in the same manner as described in Example 6. The peel strength of the bonded portion was 26 Kg/cm as measured at 37° C. A lid was double-seamed on one opening of the can body, and warm water maintained at 95° C., was filled and a lid was double-seamed to the other opening. The filled can was subjected to a heat treatment at 125° C. for 90 minutes. Breakage of the can body was not caused at all by this heat treatment. The peel strength of the bonded portion after the heat treatment was 22 Kg/cm as measured at 20° C. The peel strengths of the bonded portion after 6 months' storage, 1 year's storage and 2 years' storage at 37° C. were 19 Kg/cm, 16 Kg/cm and 13 Kg/cm, respectively, as measured at 20° C. In each case, breakage of the bonded portion was not observed, and a good vacuum state was maintained in the can and the inner pressure was lower by at least 40 cmHg than the atmospheric pressure.

EXAMPLE 8

Lids were double-seamed to one openings of bonded cans prepared by using the undercoating compositions obtained in Example 1, respectively, and warm water maintained at 95° C. was filled in the cans and lids were double-seamed to the other openings. The resulting filled can bodies were then subjected to a heat treatment at 115° C. for 60 minutes. The number of can bodies broken by the heat treatment was checked. After the heat treatment, the filled can bodies were allowed to stand still at room temperature for 1 week or stored for 1 year and the inner vacuum [atmospheric pressure (76 cm Hg)—inner pressure (cm Hg absolute)] of cans was determined to examine the leakage shortly after the heat treatment and the delay leakage by long-time storage. Obtained results are shown in Table 8.

In Table 8, the run numbers correspond to those in Table 1.

Table 8

| Run No. | Number of can bodies broken at heat treatment at 115° C. for 60 minutes (n = 100) | Inner vacuum of cans after 1 week's storage (cmHg) (n = 20) | Inner vacuum of cans after 1 year's storage (cmHg) (n = 20) | Remarks |
|---|---|---|---|---|
| 1 | 0 | 45 | 42 | present invention |
| 2 | 0 | 44 | 41 | " |
| 4 | 0 | 46 | 42 | " |
| 6 | 0 | 47 | 43 | " |
| 7 | 0 | 48 | 44 | " |
| 8 | 0 | 45 | 42 | " |
| 10 | 0 | 46 | 43 | " |
| 12 | 0 | 45 | 42 | " |
| 13 | 0 | 44 | 42 | " |
| 16 | 0 | 40 | 0 | comparison |
| 17 | 0 | 40 | 5 | " |
| 18 | 0 | 38 | 0 | " |
| 19 | 0 | 35 | 0 | " |

EXAMPLE 9

Lids were double-seamed to one openings of the bonded cans prepared by using the undercoating compositions obtained in Example 2, and warm water maintained at 95° C. was filled in the cans. Then, lids were double-seamed to the other openings, and the filled can bodies were heat-treated at 115° C. for 60 minutes. The number of the can bodies broken by the heat treatment was checked. After the heat treatment, the filled can bodies were stored for 1 week or 1 year, and the inner vacuum (cm Hg) was determined to examine the leakage shortly after the heat treatment and the delay leakage by long-time storage. Obtained results are shown in Table 9.

Run numbers in Table 9 correspond to those in Table 2.

Table 9

| Run No. | Number of can bodies broken at heat treatment at 115° C. for 60 minutes (n = 100) | Inner vacuum of cans after 1 week's storage (cmHg) (n = 20) | Inner vacuum of cans after 1 year's storage (cmHg) (n = 20) | Remarks |
|---|---|---|---|---|
| 1 | 0 | 40 | 0 | comparison |
| 2 | 0 | 45 | 40 | present invention |
| 3 | 0 | 47 | 43 | " |
| 4 | 0 | 46 | 44 | " |
| 5 | 0 | 48 | 44 | " |
| 6 | 0 | 45 | 41 | " |
| 7 | 0 | 42 | 20 | comparison |
| 8 | 0 | 40 | 10 | " |
| 9 | 0 | 38 | 5 | " |
| 10 | 0 | 38 | 3 | " |

Leakages caused when bonded can bodies are subjected to retort sterilization are classified into the following three kinds.

(1) Can Body Breakage:

When the bonding strength is drastically reduced in the side seam portion by retort sterilization, the can body is broken from the side seam during retort sterilization and leakage of the content is caused.

(2) Micro-Leakage:

When the bonding strength is reduced at some points on the bonding interface of the side seam portion, though the above-mentioned can body breakage is not caused, micro-leakage is caused from such points after retort sterilization.

(3) Delay Leakage:

Even if leakage is not caused shortly after retort sterilization, in the area close to the double-seamed portion of the side seam, the bonding between the metal material and the undercoating composition becomes insufficient with the lapse of time owing to processing and retort sterilization. In this case, leakage gradually is caused during long-time storage.

In case of bonded cans prepared by using an undercoating composition comprising a phenol-formaldehyde resin formed by using a mixed phenol in which the amount of the dicyclic phenol is outside the range specified in the present invention and an epoxy resin, heat sterilization is possible (breakage of can bodies is not caused) when the temperature is relatively low, e.g., 115° C., but as is seen from the results shown in Tables 8 and 9, micro-leakage and delay leakage are considerable in case of such can bodies. Further, in case of bonded can bodies prepared by the above-mentioned undercoating composition, breakage of can bodies become conspicuous when the sterilization temperature is high, e.g., 125° C.

In contrast, in case of bonded cans prepared by using an undercoating composition comprising a phenol-formaldehyde resin formed by using a mixed phenol in which the amount of the dicyclic phenol is in the range specified in the present invention and an epoxy resin, even such micro-leakage or delay leakage is not caused at all, and they can sufficiently resist the heat sterilization conducted at such a high temperature as 125° C.

What we claim is:

1. A bonded can adapted to be subjected to a retort sterilization treatment, which consists of a metal material having both the confronting side edges bonded together by a linear polyamide adhesive through an epoxy-phenolic resin undercoating composition, wherein said epoxy-phenolic resin undercoating composition comprises 50 to 95% by weight of an epoxy resin having a number average molecular weight of 800 to 5500, which is obtained by condensation of an epihalohydrin with bisphenol A, and 5 to 50% by weight of a resol-type phenol-aldehyde resin having a number average molecular weight of 200 to 1000, which is obtained by reacting a mixed phenol comprising 65 to 98% by weight of a dihydric phenol represented by the following general formula:

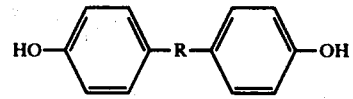

wherein R stands for a bridging group or is a direct bond, and 2 to 35% by weight of a monohydric phenol with an aldehyde in the presence of a basic catalyst.

2. A bonded can as set forth in claim 1 wherein said dihydric phenol is a dihydric phenol represented by the following general formula:

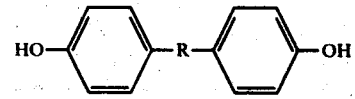

wherein R is a direct bond or R stands for a group —O— or —CR¹R²— in which R¹ and R² stand for a hydrogen or halogen atom or an alkyl or perhaloalkyl group having up to 4 carbon atoms.

3. A bonded can as set forth in claim 1 wherein said dihydric phenol is 2,2-bis(4-hydroxyphenyl)propane or 2,2-bis(4-hydroxyphenyl)butane.

4. A bonded can as set forth in claim 1 wherein said monohydric phenol is at least one member selected from bifunctional and trifunctional monohydric phenols.

5. A bonded can as set forth in claim 1 wherein said monohydric phenol is a bifunctional phenol represented by the following general formula:

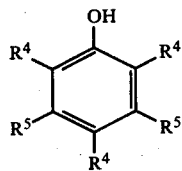

wherein $R^4$ stands for a hydrogen atom or an alkyl or alkoxy group having up to 4 carbon atoms with the proviso that two of three $R^4$'s stand for a hydrogen atom and one of them stands for an alkyl or alkoxy group having up to 4 carbon atoms, and $R^5$ stands for a hydrogen atom or an alkyl group having up to 4 carbon atoms.

6. A bonded can as set forth in claim 1 wherein in the resol-type phenol-aldehyde resin, said dihydric phenol (a) and said monohydric phenol (b) are contained at an (a)/(b) weight ratio of from 95/5 to 75/25.

7. A bonded can as set forth in claim 1 wherein the resol-type phenol-aldehyde resin is a resin having a number average molecular weight of 250 to 800, which is obtained by condensing 1 mole of said mixed phenol with 1.5 to 3.0 moles of formaldehyde.

8. A bonded can as set forth in claim 1 wherein said epoxy resin has a number average molecular weight of 1400 to 5500.

9. A bonded can as set forth in claim 1 wherein in said epoxy-phenolic undercoating composition, the epoxy resin/resol-type phenol-aldehyde resin weight ratio is in the range of from 90/10 to 60/40.

10. An undercoating composition for production of bonded cans to be subject to a retort sterlization treatment, which comprises 50 to 95% by weight of an epoxy resin having a number average molecular weight of 800 to 5500, which is obtained by condensation of an epihalohydrin with bisphenol A, and 5 to 50% by weight of a resol-type phenol-aldehyde resin having a number average molecular weight of 200 to 1000, which is obtained by reacting a mixed phenol comprising 65 to 98% by weight of a dihydric phenol represented by the following general formula:

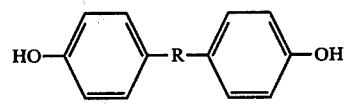

wherein R stands for a bridging group or is a direct bond, and 2 to 35% by weight of a monohydric phenol with an aldehyde in the presence of a basic catalyst.

* * * * *